(12) United States Patent
Brown (10) Patent No.: US 7,098,640 B2
(45) Date of Patent: Aug. 29, 2006

(54) METHOD AND APPARATUS FOR INTELLIGENTLY SETTING DEAD TIME

(75) Inventor: James S Brown, San Pedro, CA (US)

(73) Assignee: International Rectifier Corporation, El Segundo, CA (US)

(*) Notice: Subject to any disclaimer, the term of this patent is extended or adjusted under 35 U.S.C. 154(b) by 0 days.

(21) Appl. No.: 11/172,163

(22) Filed: Jun. 30, 2005

(65) Prior Publication Data

US 2006/0007713 A1    Jan. 12, 2006

Related U.S. Application Data

(60) Provisional application No. 60/585,678, filed on Jul. 6, 2004.

(51) Int. Cl.
G05F 1/40 (2006.01)

(52) U.S. Cl. .................... 323/283; 323/224

(58) Field of Classification Search ............ 323/224, 323/283, 284, 282
See application file for complete search history.

(56) References Cited

U.S. PATENT DOCUMENTS

| | | | | |
|---|---|---|---|---|
| 4,654,769 A | 3/1987 | Middlebrook | | 363/16 |
| 5,532,577 A | 7/1996 | Doluca | | 323/266 |
| 5,627,460 A | 5/1997 | Bazinet et al. | | 323/288 |
| 5,905,370 A | 5/1999 | Bryson | | 323/283 |
| 5,943,227 A | 8/1999 | Bryson et al. | | 363/95 |
| 6,057,607 A | 5/2000 | Rader, III et al. | | 307/11 |
| 6,157,182 A | 12/2000 | Tanaka et al. | | 323/284 |
| 6,396,250 B1 | 5/2002 | Bridge | | 323/283 |
| 6,871,289 B1 * | 3/2005 | Pullen et al. | | 713/300 |
| 6,940,189 B1 * | 9/2005 | Gizara | | 307/151 |
| 6,956,361 B1 * | 10/2005 | Mozipo et al. | | 323/283 |
| 6,960,904 B1 * | 11/2005 | Matsuura et al. | | 323/283 |

OTHER PUBLICATIONS

"High-Efficiency Predictive Synchronous Buck Driver", Texas Instruments, SLUS486B, Aug. 2001.
Yousefzadeh, V. et al., "Sensorless Optimization of Dead Times in DC—DC Converters with Synchronous Rectifiers", Colorado Power Electronics Center, ECE Department, University of Colorado, Boulder, CO, Jan. 2005, pp. 911-917.

* cited by examiner

Primary Examiner—Shawn Riley
(74) Attorney, Agent, or Firm—Ostrolenk, Faber, Gerb & Soffen, LLP (57) ABSTRACT

Apparatus for setting dead time between ON times of two series connected switches of a power converter circuit connected across a supply potential, the apparatus comprising a circuit for monitoring a power converter circuit parameter and providing an output corresponding to the circuit parameter; a memory addressed by a signal related to the output of the monitoring circuit, the memory having values stored therein related to the dead times and associated with values of the circuit parameter; a processor providing an output of the memory associated with the value of the circuit parameter to set the dead time corresponding to the stored value in the memory, and a dead time implementing stage for implementing the dead time in accordance with the output of the memory.

53 Claims, 7 Drawing Sheets

METHOD AND APPARATUS FOR INTELLIGENTLY SETTING DEAD TIME

CROSS REFERENCE TO RELATED APPLICATION

This application claims the benefit and priority of U.S. Provisional Patent Application Ser. No. 60/585,678 filed Jul. 6, 2004 and entitled "Intelligent Dead Time", the entire disclosure of which is incorporated herein by reference.

BACKGROUND OF THE INVENTION

The present invention relates to power supplies and in particular to voltage converters employing two controlled switches, one of which operates as a synchronous rectifier. The two switches are generally controlled so that both switches are never on at the same time. A "dead time" is provided between the on-times of the two switches to prevent cross conduction across the DC voltage supply between which the two switches are connected in series.

Synchronous rectification has been widely adopted for use in low voltage output converters of various topologies: Buck, boost, fly back, and forward. By substituting a MOSFET switch for a silicon or Schottky diode, rectification losses can be dramatically reduced.

For synchronous converters, it is essential that a non-overlap period (dead time) be maintained in order to prevent excessive cross conduction of the control switch with the synchronous rectifier switch. The power loss penalty for significant overlap is extremely high compared to the additional conduction losses occurring during dead time.

Still, dead time losses are significant; especially as converter operating frequency is increased. Using the example of a synchronous buck converter with the following characteristics:

Operating frequency=1 Mhz
Input voltage=12 volts
Output voltage=1 volt
Output current=40 amperes
Synchronous switch on resistance=3 m$\Omega$
Synchronous switch body diode VF @ 40A=0.8V Instantaneous power loss will be 4.8 watts with the synchronous switch FET on, but 32 watts with only the body diode conducting. At the above conditions, this translates into an additional 27 mW power loss per nanosecond of dead time. Two switching edges per cycle of 20 ns dead time each results in an additional 1.088 watts of loss in the synchronous switch, a 20% increase in losses for that component. Using a Schottky diode in parallel with the MOSFET will reduce that figure by 30%-to-40%, but at additional cost and component count.

Additionally, once the body diode of the synchronous switch conducts, it is subject to a reverse recovery period and associated charge which must be swept out of the junction. This amounts to cross conduction and causes additional losses in the control FET.

The present invention seeks to minimize the power losses associated with dead time. This is accomplished by minimizing dead time to reduce body diode conduction losses, and in some cases, by allowing FET switch cross conduction to eliminate body diode conduction altogether, thus eliminating reverse recovery associated losses.

There are a number of techniques that are known for reducing dead time. These include:

Adjustable dead time. Dead time is adjusted during the design stage so that cross conduction will be avoided under all operating conditions and over the full process variation of all components involved in achieving the dead time. Process variation of semiconductors can be significant and circuit operation may be over a wide range. Consequently, when no crossover is achieved with the worst case components at the worst case conditions, dead time with best case components and conditions is excessive. This results in excessive wasted power loss.

Adaptive dead time. Adaptive dead time is an improvement over adjustable dead time in that it can adjust on the fly as conditions change, and from unit-to-unit over component variations. Essentially it is logic control where the gate of one switch is prevented from turning on, until the gate of the other switch has been detected to turn off. Superficially, this seems to solve the problem, but in practice it does not. Finite time periods are required for logic control, and for charging and discharging gates of the power switches themselves. In actual practice this results in dead times on the order of 10 ns-to-30 ns per switching transition for a total of 20 ns-to-60 ns per cycle.

Predictive dead time. Most of the problem with adaptive dead time is the time required to switch the FETs off and on. Predictive dead time solves that deficiency by using a phase locked loop or some other loop to reduce dead time until it is near zero. This appears to provide many of the same benefits as the present invention, but the use of a control loop has attendant disadvantages. Since this methodology relies on a control loop of some sort to set dead time, there is also an associated settling time in that loop. During transient conditions, cross conduction may occur while the loop tries to settle into a new steady state. If fixed dead time is programmed into the loop to avoid cross conduction, then most of the time there will be more than minimum dead time and associated losses. In any case, the loop solution relies on some arbitrary electrical conditions rather than minimizing the losses associate with dead time. Test results indicate that this method does not result in the lowest possible power losses.

Power loss minimizing dead time (PLMDT). This technique has all the advantages of the present invention, except that it does not "remember" the best dead time settings for various operating conditions. In terms of power supply operation, this optimization takes a long time—tens of milliseconds. That means that in fast load transient environments, the PLMDT operation cannot keep up with power supply changes. Averaging techniques allow the PLMDT circuitry to find an "optimum" average value that works best across a wide range of load currents. This works very well, but still falls short of having the exact right dead time for each current. PLMDT is the subject of Applicant's co-pending patent application IR-2673, U.S. Ser. No. 11/058,969 filed Feb. 16, 2005, incorporated by reference in its entirety herein.

Figure 4:
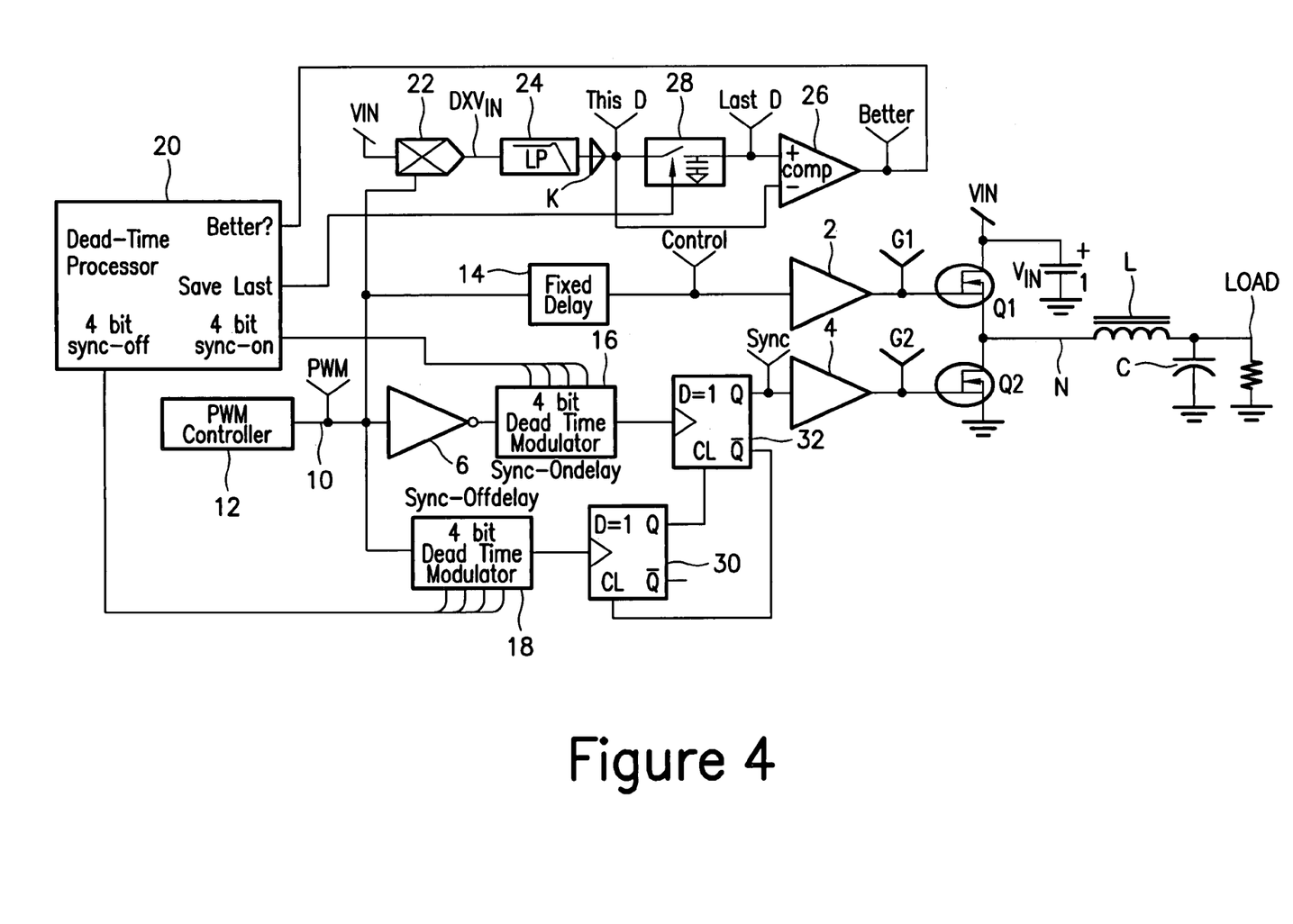
FIG. 4 shows a circuit that implements power loss minimizing dead time (PLMDT) which can be used in conjunction with the invention to update stored dead time values in the memory.

FIG. 4 shows a converter circuit comprising transistors Q1 and Q2 wherein PLMDT is used to set the dead time. Changes in duty factor of a PWM signal 10 are used to estimate power loss changes. A multiplier block 22 is used to modulate $V_{IN}$ (the supply voltage to switches $Q_1$ and $Q_2$) with the PWM signal, producing the signal $D \times V_{IN}$, which is proportional to the duty factor. This signal is passed though a low pass filter 24 creating a slow moving signal which is equal to what the output voltage would be if there were no converter losses. This signal is amplified by a factor k ($k \times D \times V_{IN}$) and split into two paths. One path goes directly to the decision comparator 26 and the other path is through, for example, a sample and hold module 28 before being applied to the decision comparator 26. The sample and hold module 28 is used to save the previous "k×D×V$_{IN}$" signal so that it can be compared to the one produced after a change in dead time.

A sample and hold module 28 is shown in FIG. 4, but the sample and hold function can be implemented in various ways, including, for example, using an "N" bit memory or other equivalent techniques. Similarly, the comparator function can be performed by a logic magnitude comparator, for example, or other equivalent techniques.

The dead time processor 20 (DTP) of FIG. 4 may be implemented with logic circuitry, a microcontroller, or a microprocessor. The DTP 20 controls the sample and hold circuit 28, sets the dead time via the dead time modulators 16 and 18, and processes the "Better" signal from the output of the decision comparator. If the new signal (This D) is smaller than the previous signal (Last D), then the new dead time is "Better" (the comparator output is high) and the DTP 20 saves this new dead time value. Otherwise the new one is discarded and the old dead time is restored. A delay is required after changing the dead time to allow the power supply feedback circuitry to settle on a new duty factor. Many factors can effect this time, but in practice a time of about 100× the switching period of the power supply seems to work well.

Though not necessary to demonstrate the principle, in practice the DTP 20 preferably averages multiple decisions over a relatively long period of time before reaching a final conclusion about a particular dead time in order to obtain reliability and prevent false dead time setting due to noise or transients. Hundreds of samples or more are desirable. This effectively averages out the effect of rapid load transients on power supply duty factor. The same averaging technique is applicable if some other means besides duty factor is used to determine power loss.

PLMDT may be implemented using digital PWM or digital signal processing (DSP) implementations, but the basic algorithm remains substantially the same.

Figures 5, 5B:
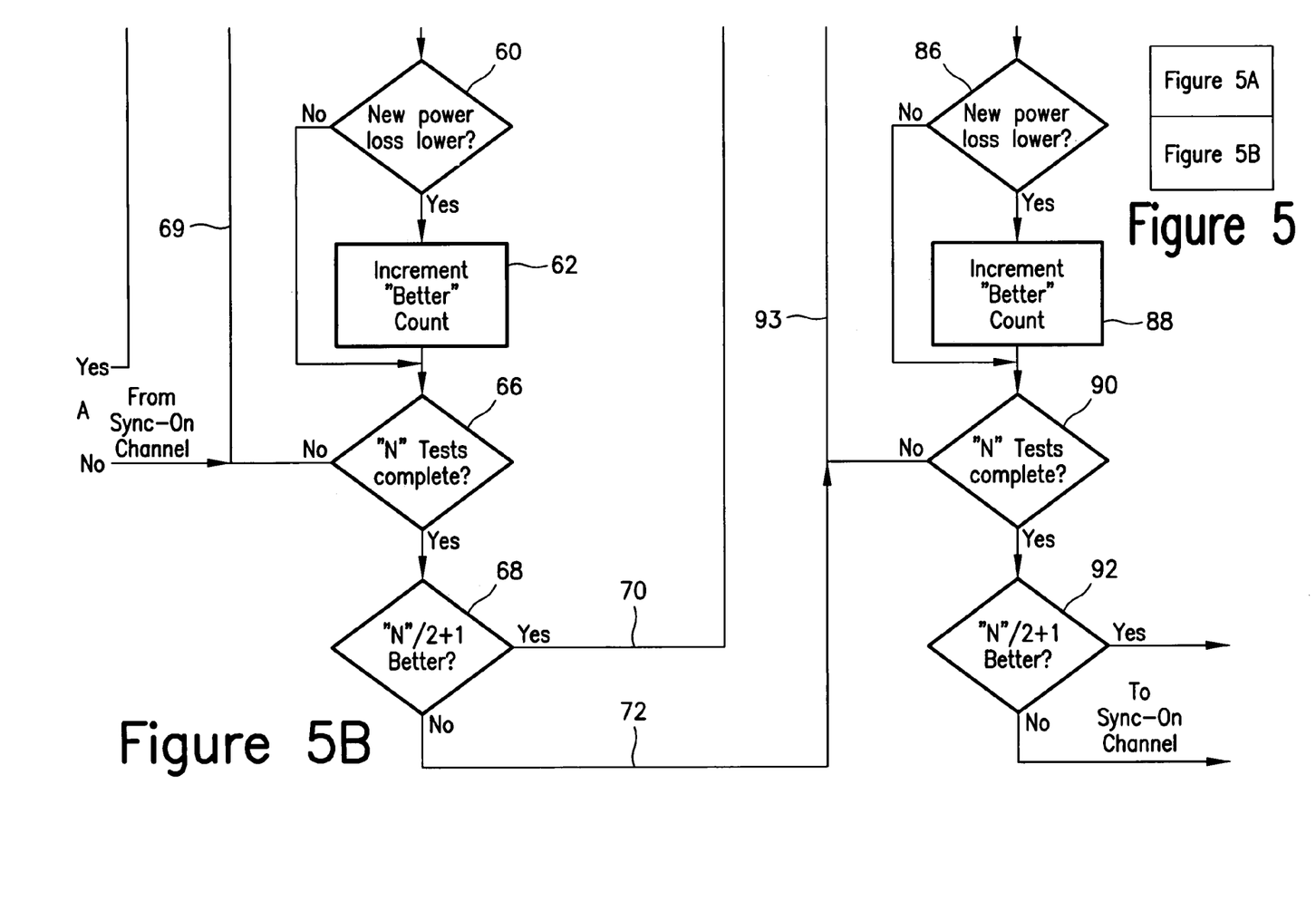
FIG. 5 shows a flow chart of an algorithm for implementing PLMDT.
Figure 5A:
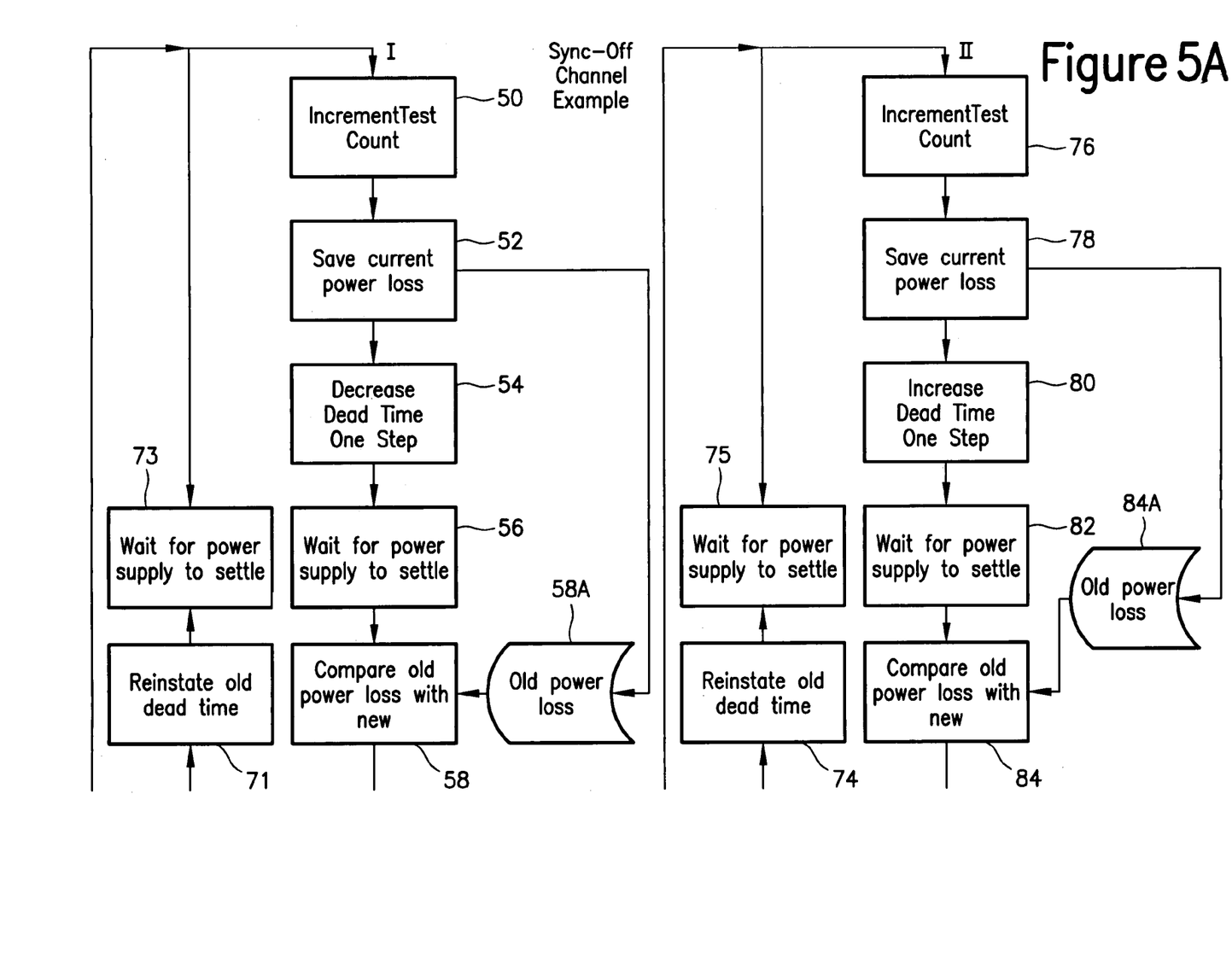

FIG. 5 shows the basic algorithm which may be implemented with a digital signal processor, microprocessor, microcontroller, or logic state machine for implementation of PLMDT. It also substantially shows an example of the process implemented by the circuitry of FIG. 4.

With reference to FIG. 5, only the flow for the sync-off channel is shown. As described below, the sync-on channel flow is substantially the same. Starting at A, assuming that the sync-off delay has been set and the result of the previous dead time was that the power loss resulting from the last dead time showed that the last sample was better than the previous sample, that is, resulting in a lower duty cycle and thus a lower power loss, entry into the flow is via "yes" at point A. A test counter that counts to "N" is incremented at 50. The current power loss is sampled and saved at 52. The dead time is shortened or decreased by one step as indicated at 54. This means the off delay is increased, since the dead time is decreased. Whether the dead time is decreased or increased initially is arbitrary. However, since the goal is to decrease power losses and this is accomplished by decreasing dead time, dead time is preferably decreased initially. In the second part (II) of the FIG. 5 flow, dead time will be increased, and the dead time that results in the lower power loss will be implemented.

A delay is implemented to allow the power supply voltage to settle as shown at 56. The new power loss (after the dead time has been changed) is now compared with the old power loss at 58. The old power loss has been saved from the previous step 52 as shown at 58A. If the new power loss is lower (for example, as determined by duty cycle), as indicated by decision block 60, flow is to block 62 wherein the "better" counter is incremented. The "better" count keeps track of the number of times the new power loss is better than the old.

If the new power loss was not better than the old power loss at step 60, the counter is not incremented. Flow is then to decision block 66 to determine if N tests are complete. As discussed above, a plurality of tests are preferably made to obtain reliable results. If N tests are not complete, flow is via line 69. At 71, the previous dead time is reinstated and a delay is implemented at 73 to allow the power supply to settle and the test counter is again incremented at 50 and the comparison is again made with the old power loss. Once N tests have been completed, exit is to 68. The dead time will have been last implemented at step 54. N tests are made to ensure that the comparisons are reliable, to account, for example, for noise or load transients which could cause an error if only a single test were made. By making multiple tests, greater accuracy and reliability is obtained.

At step 68, a determination is made if N/2+1 of the tests were better, that is, if the "better" counter shows that more than half the tests made showed a better power loss. If so, then entry is made via flow line 70 to part II of the flow. If N/2+1 tests were not better, then the old dead time is reinstated at 74 and a delay is implemented at 75 before proceeding to step 76.

At step 76, the test counter "N" is again incremented. The current power loss is saved at 78, the dead time is increased by one step at 80, reducing the sync-off delay. At 82, a delay is implemented to allow the power supply to settle. At 84, the old power loss 84A saved at step 78 is compared with the new power loss. The old power loss is shown at 84A. At step 86, a determination is made as to whether the new power loss is lower with the increased dead time. If the new power loss is lower, the "better" counter is incremented at 88. If the new power loss is not lower or after incrementing the better counter at 88, a check is made to determine if N tests have been completed. If not, a return is made via line 93 and the test counter is incremented again at 76 and the comparison at 84 is again made. Once N tests have been completed at step 90, a check is made at 92 to determine that more of the N tests were better. If this is the case, then the flow is to the synchronous on channel flow which is substantially identical to the synchronous off channel example shown in FIG. 5. The synchronous on channel dead time delay will be processed in the same way as the synchronous off channel example shown in FIG. 5. Accordingly, in the synchronous on channel, similar flow will occur in that the old power loss will be compared with the new power loss for both a decrease and an increase in the dead time, and if the power loss is better, the new dead time will be maintained, and if not, the old dead time will be restored, substantially the way as shown in the synchronous off channel example of FIG. 5.

The PLMDT technique results in optimizing the dead time. However, results are a compromise based on average circuit conditions rather than an optimum based on exact instantaneous operating conditions. The Intelligent Dead Time (IDT) technique disclosed herein solves the "speed" problems associated with PLMDT.

SUMMARY OF THE INVENTION

According to the invention, apparatus is provided for setting dead time between ON times of two series connected switches of a power converter circuit connected across a supply potential, the apparatus comprising a circuit for monitoring a power converter circuit parameter and providing an output corresponding to the circuit parameter; a memory addressed by a signal related to the output of the monitoring circuit, the memory having values stored therein related to the dead times and associated with values of the circuit parameter; a processor providing an output of the memory associated with the value of the circuit parameter to set the dead time corresponding to the stored value in the memory, and a dead time implementing stage for implementing the dead time in accordance with the output of the memory.

The invention also comprises a method for setting dead time between ON times of two series connected switches of a power converter circuit connected across a supply potential, the method comprising monitoring a power converter circuit parameter and providing an output corresponding to the circuit parameter; addressing a memory with a signal related to the output and having values stored therein related to the dead times and associated with values of the circuit parameter; providing an output of the memory associated with the value of the circuit parameter to set the dead time corresponding to the stored value in the memory, and implementing the dead time in accordance with the output of the memory.

The invention applies both to switches directly connected across the supply potential as well as topologies wherein the two switches may be separated by a transformer such as in synchronous boost, flyback or forward converters.

According to one aspect of the invention, called Intelligent Dead Time (IDT) herein, dead time is varied in response to changing converter and input conditions using a lookup table, or an appropriate closed form solution. In either case, memory is used to save the dead time values or coefficients for later use. If this memory is to be retained during power down, then non-volatile memory is required. Look-up tables can be stored directly, but for closed form solutions the coefficients may be stored.

In one implementation, some form of Power Loss Minimizing Dead Time (PLMDT) (see the above co-pending patent application), may be used to map out the best dead-time relative to circuit conditions. There are several options for doing this.

With PLMDT, the dead time is varied in such a manner so as to minimize overall converter power losses. Several means are available for monitoring power loss, including monitoring combinations of input and output voltage and current. If input and output voltage are fixed, only current monitoring is required and if averaging techniques are applied, only input current need be measured. The most cost effective and convenient means, however, is to use control switch duty factor as a relative gauge of power losses. When dead time is adjusted to minimize duty factor, converter power losses will also be minimized. In one implementation, the error amplifier output is used in place of the duty factor. This is possible because the error signal is the modulation input to the PWM stage. Consequently, the PWM duty factor is proportional to the error voltage.

In one embodiment of the present invention, saved dead-time values from PLMDT are used so that in the future, power loss can be minimized without taking the time according to the PLMDT technique at that instant to search for optimum values. Although it is preferred to use PLMDT, other techniques for updating the stored dead time value can also be employed.

The stored dead time values can be determined at the design stage during prototyping. One advantage of this option is that it would not be necessary for the PLMDT circuitry to reside in the final application. The main disadvantage is that the dead time selections would need to encompass expected manufacturing variability, component tolerances, and component aging. This forces more conservative settings which will result in less than optimum losses.

If the PLMDT circuitry is incorporated in the designed product application (typically into the driver ICs), then the dead time can be mapped out at first startup. This has the advantage of incorporating manufacturing and component tolerances into the dead time settings. The disadvantage is that it does not include component aging, so the setting will have to allow for aging. The circuit will be more optimized than the design stage calibration, but still not ideal. It may be good enough for most applications, however.

A preferred option from a performance standpoint is to have the mapping done at periodic intervals throughout the life of the product application. In this way, the optimum settings, once found, can be periodically updated. For example, periodically, the system can invoke PLMDT to determine new, optimized values which are then stored in memory.

Other features and advantages of the present invention will become apparent from the following description of the invention which refers to the accompanying drawings.

BRIEF DESCRIPTION OF THE DRAWING(S)

The invention will now be described in greater detail in the following detailed description with reference to the drawings, in which.

DETAILED DESCRIPTION OF PREFERRED EMBODIMENTS OF THE INVENTION

Figure 1:
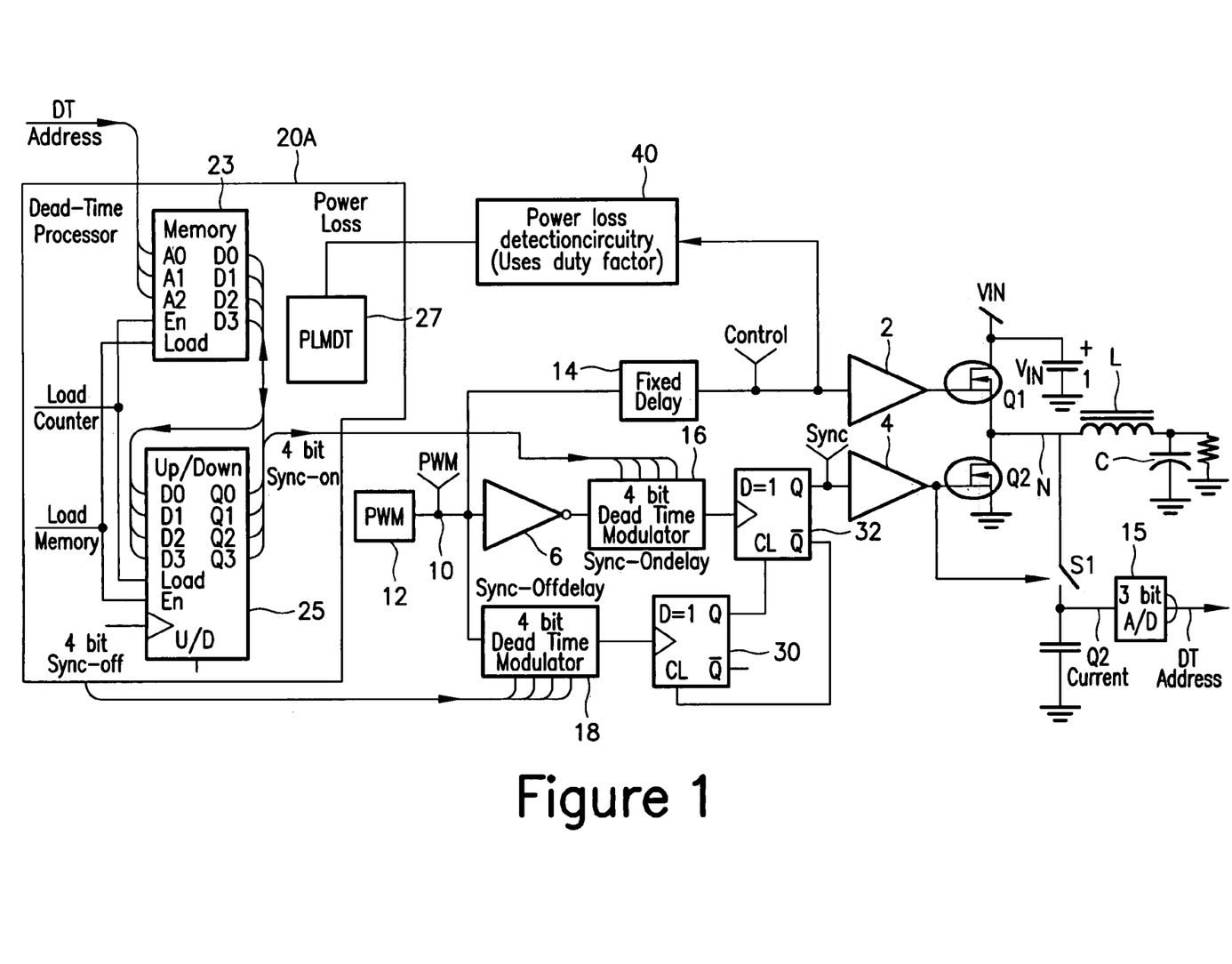
FIG. 1 is a block diagram of one embodiment of a circuit implementation according to the invention.

Turning again to the drawings, FIG. 1 shows one possible implementation of a converter circuit implementing the intelligent dead time (IDT) method according to the present invention. Many other implementations are possible because the essential element of the present invention is that optimum dead time is "memorized" over the power supply operating range, and then "recalled" when needed later. Conditions monitored by the system will vary from one implementation to another, but may include: Input voltage, output current (e.g., synchronous switch current), and MOSFET driver temperature.

FIG. 1 shows one possible implementation of the present invention which combines digital and analog circuitry. Others are possible and most blocks and functions can be implemented with digital circuitry as well as analog.

FIG. 1 shows a DC—DC converter circuit that has been modified to incorporate the technique according to the present invention to intelligently set dead time to minimize power losses during dead time. Preferably, the circuit employs PLMDT, on a periodic basis, to optimize and update the dead times. The converter includes two switches, $Q_1$ and $Q_2$, typically MOSFETs, connected in series between the power supply nodes $V_{IN}$ and ground. The converter shown is a buck converter, but the invention is applicable to any form of switching mode power supply with synchronous rectification.

As well known, the switched node N of a buck converter is coupled to the load through an output inductor L. An output capacitor C is coupled across the load. The gate of each switch $Q_1$ and $Q_2$ is coupled to pulse width modulated (PWM) signals (control and sync, respectively) from a PWM controller 12 via gate drive circuitry 2 and 4, shown schematically, and the additional circuitry now to be described. Since the gate drive signals are complementary, an inverter 6 is shown schematically in one of the gate drive channels. As well known, in a buck converter, switch $Q_1$ functions as the control switch and switch $Q_2$ functions as a synchronous rectifier.

Figure 2:
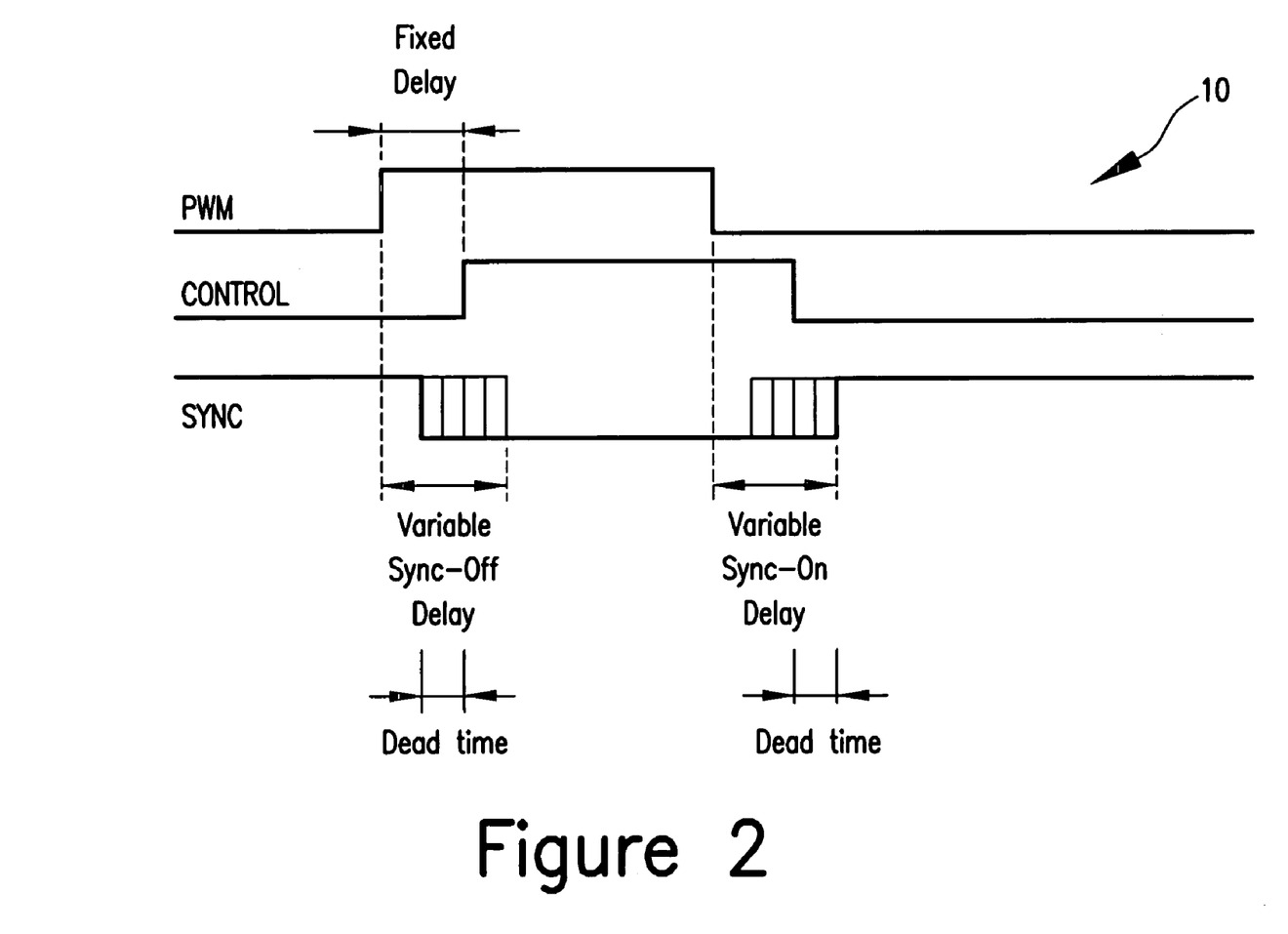
FIG. 2 shows waveforms of the circuit of FIG. 1 or 1A.

PWM signal 10 is generated in known fashion by PWM controller 12. The PWM signal 10 is delayed by the fixed delay block 14. This allows the programmable dead time range to include both positive and negative values of dead time. The off-time and on-time of the synchronous switch $Q_2$ gate signal is varied, as shown in FIG. 2, thus changing the amount of dead time. The Sync-On delay is implemented, for example, via a 4 bit dead time modulator 16, which may comprise, e.g., a counter, tapped analog or digital delay line, or single shot circuit. Likewise the Sync-Off delay is implemented by a similar modulator 18. They are programmed independently by the dead-time processor 20A and allow independent adjustment of the Sync-On and Sync-Off delay time.

In the example of FIG. 1, the output of a 3 bit A/D converter 15 that monitors the current in transistor Q2 is used to directly address a memory 23, which may be a part of the processor 20A, that contains the dead time settings for each of the 8 possible current levels determined by the 3 bits. Although a 3 bit converter is shown, a converter having greater resolution, i.e., more bits, can also be used. The counter 25 is normally used as a latch and is loaded with memory contents for transfer out to the dead time modulators 16 and 18. These modulators operate as described above to implement the dead time and are the same as the modulators used in the PLMDT technique.

FIG. 1 shows Q2 current being monitored by sensing the current in a parallel connected switch S1, which may be a lower current carrying transistor switch, whose current bears a defined relationship to the current in Q2. The switch S1 implements a sample and hold circuit and keeps potentially damaging voltage out of the A/D converter 15 during continuous FET on time. Other current sensing solutions are possible. For example, a simple sense resistor RS in series with the output switches Q1 and Q2 (see FIG. 1A) or the average DC voltage $V_{DC}$ across the inductor L (see FIG. 1A) can be used as an indication of the current.

FIG. 2 shows waveforms of the circuitry of FIG. 1. PWM signal 10 is as shown. Signal CONTROL is delayed by the fixed delay of delay module 14. The signal SYNC supplied to the gate of synchronous switch $Q_2$ has a variable sync-off delay and a variable sync-on delay as described above, thus determining the dead time between signals CONTROL and SYNC. The sync-off delay is determined by the DTP 20A and supplied as a 4 bit digital signal to the modulator 18. The output of modulator 18 is provided to D flip-flop 30, which, when it sets, clears D flip-flop 32, turning off the switch $Q_2$ at the variable delay. Similarly, modulator 16 turns on the switch $Q_2$ by setting D flip-flop 32 at the selected variable on delay. When flip-flop 32 output is high, switch $Q_2$ is turned on. When flip-flop 32 output goes low, it clears flip-flop 30 so that flip-flop 30 will be ready to set at the next sync-off delay as determined by modulator 18. The fixed delay 14 in the control channel delays the CONTROL PWM signal a sufficient amount of time so that modulators 16 and 18 can, effectively, implement both positive and negative dead times in the synchronous channel, effectively allowing the synchronous turn-on and turn-off to be either delayed or advanced, as required to achieve the selected dead time.

Figure 1A:
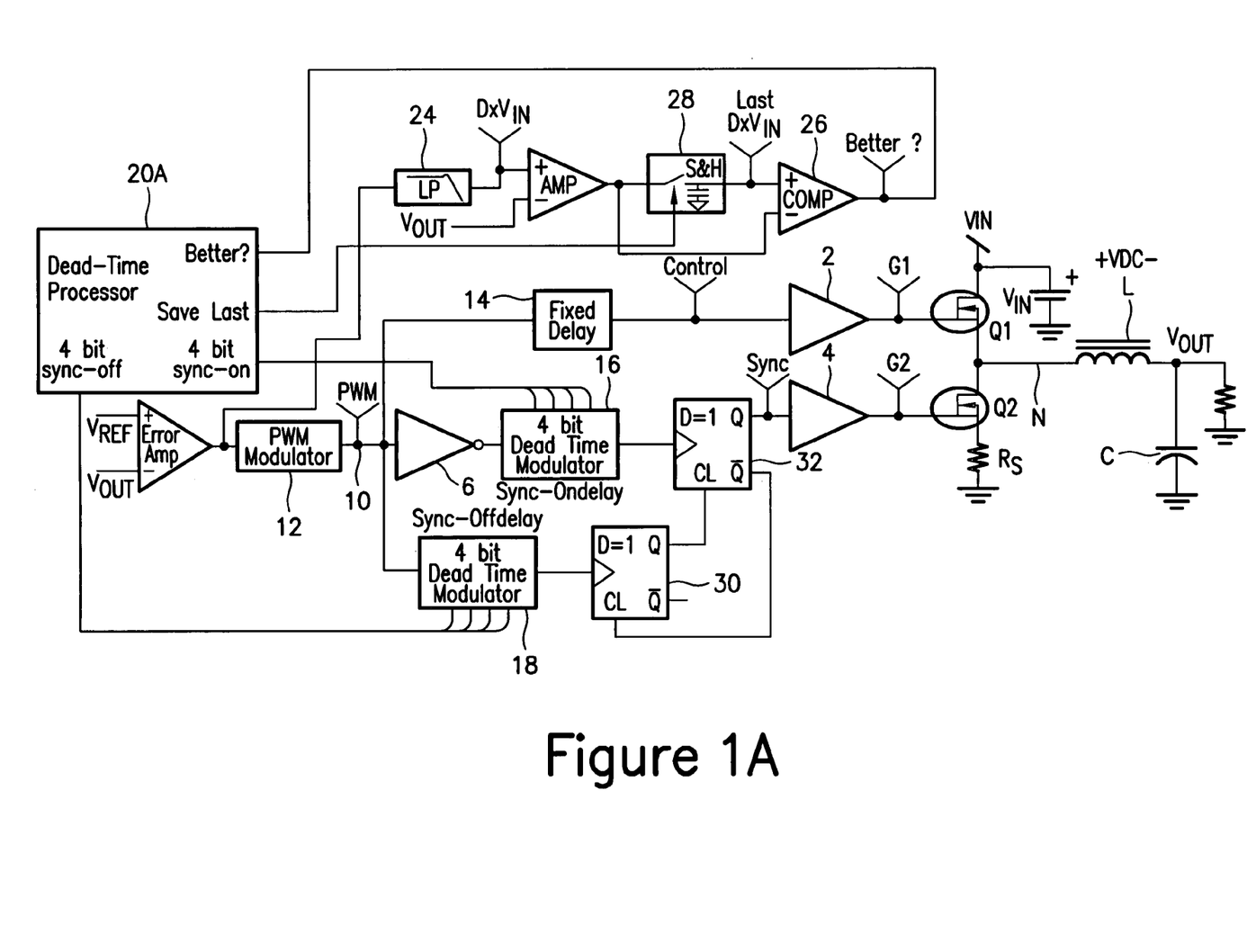
FIG. 1A shows a second embodiment.

The dead time processor 20A preferably implements a PLMDT algorithm via a module 27 as described above and in the above co-pending patent application. PLMDT module 27 is supplied with a signal corresponding to power loss by power loss detection circuit 40. Preferably, the circuit monitors duty factor of the PWM signal as shown, although other parameters can be monitored instead. Circuit 40 may comprise, for example, elements 22 and 24 of FIG. 4, providing a signal proportional to duty factor and thus power loss associated with each dead time. In another implementation, the power loss can be determined by monitoring the PWM circuits' error amplifier output as an indication of duty factor. This is shown in FIG. 1A for a circuit implementing PLMDT. The output of the error amplifier 11 can be used as an indication of duty factor, and thus power loss. This is possible because the error signal is the modulation input to the PWM stage. Consequently, the PWM duty factor is proportional to the error voltage. PLMDT module 27 performs the necessary steps of the PLMDT algorithm to determine the optimal dead time when it is invoked, preferably periodically. PLMDT module 27 may be a combination of digital, analog and software functions, as described above with respect to the discussion of PLMDT.

Preferably, the PLMDT algorithm is implemented periodically. In such case, the counter 25 may be used to test dead time (DT) values one above and one below that saved in memory to see if one has lower losses than the current DT setting.

Figure 3:
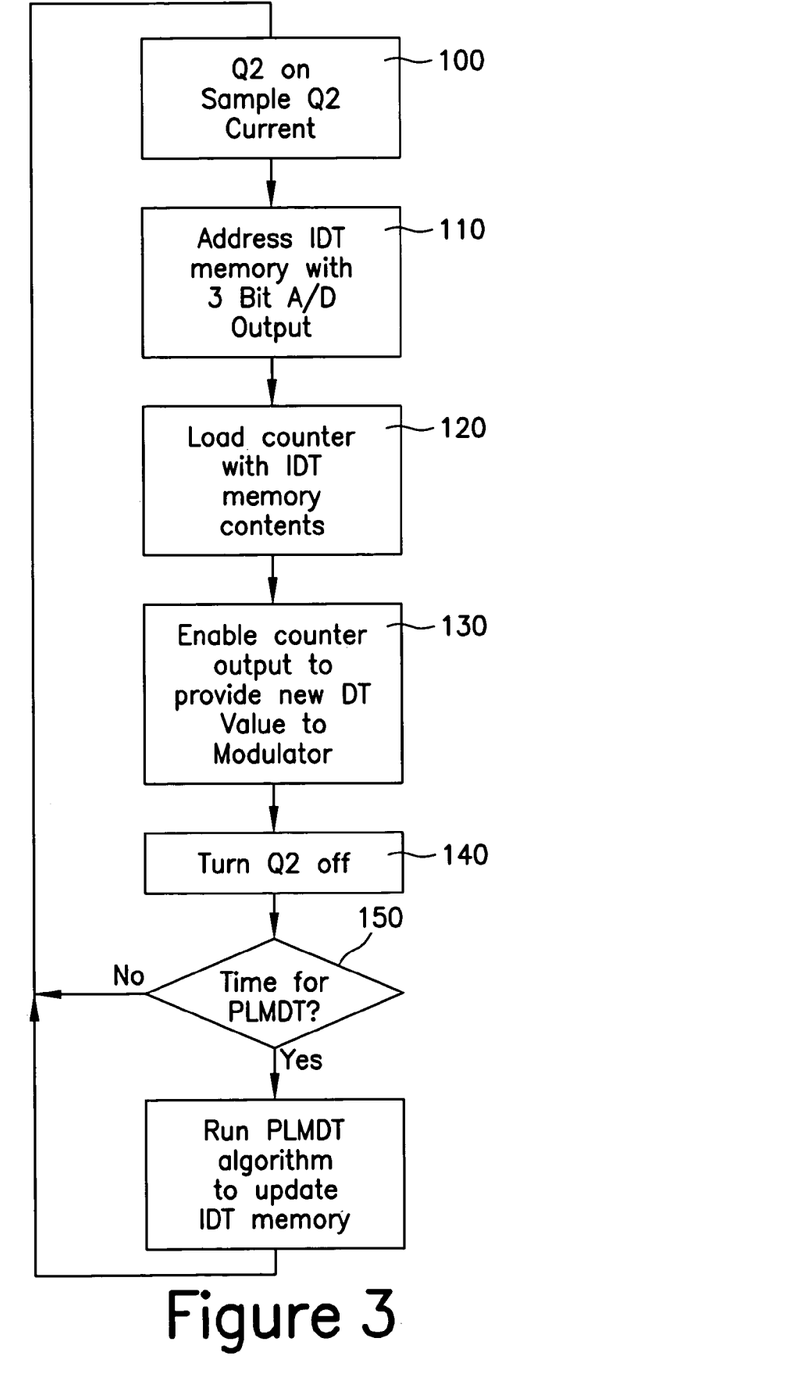
FIG. 3 is a flow chart of an algorithm implemented in a digital implementation of the invention.

FIG. 3 shows a basic operation sequence for IDT.

With reference to FIG. 3, at step 100, the current in Q2 is sensed when Q2 is turned on. The memory 23 is addressed at step 110 by the output of the A/D converter 15, which supplies a digital value of the sensed circuit. The memory 23 contents correspond to dead time (sync-on delay and sync-off delay) for the corresponding mapped value of Q2 current. The counter 25 is loaded with the IDT memory contents at 120. The counter 25 output is enabled at 130 to provide a new DT value (sync-on delay and sync-off delay) to the modulators 16 and 18.

Q2 is then turned off (140) at the appropriate time in the PWM cycle as determined by the sync-off delay. A check is then made to determine if PLMDT is to be implemented at 150. If not, a return is made to the beginning of the loop and Q2 is turned on again and the loop repeats. If at 150 it is time to implement PLMDT (preferably implemented periodically), then the PLMDT algorithm 27 of processor 20A is implemented and the IDT memory is updated with the new, better power loss minimizing dead times (for the sensed Q2 current) to be used in the next cycles until PLMDT is again implemented. In one implementation, dead time values above and below the value stored in memory are tested by counting one-up and one-down via counter 25 to see which is better.

IDT is capable of changing DT values on a power supply cycle by cycle basis. Thus, there are no load transient issues associated with its operation. On the other hand, when PLMDT is periodically invoked, care must be taken to insure that the DT values stored are actually those corresponding to the correct current. This should be performed by taking into account that PLMDT is best done by taking average results over tens of milliseconds.

A method to accomplish this is to use the PLMDT circuitry to map out optimum dead times at power supply first start up. The values may be stored in non-volatile memory for use throughout the lifetime of the power supply. This would be facilitated by applying a well defined load to the supply during first startup, and then stepping that load through the full range of currents.

According to the invention, dead-time control is optimized, to minimize power loss, yet without having to take time to search for the correct dead time. Using the end result, that is, power loss, to set dead time, rather than wave edges or synchronous switch conduction voltage, bypasses potential sources of additional power loss. It does not require knowing the relative importance of minor cross conduction versus a reduction in synchronous switch reverse recovery losses since it always picks the lowest power loss.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. Apparatus for setting dead time between ON times of two series connected switches of a power converter circuit connected across a supply potential, the apparatus comprising:
   a circuit for monitoring a power converter circuit parameter and providing an output corresponding to the circuit parameter;
   a memory addressed by a signal related to the output of the monitoring circuit, the memory having values stored therein related to the dead times and associated with values of the circuit parameter;
   a processor providing an output of the memory associated with the value of the circuit parameter to set the dead time corresponding to the stored value in the memory, and
   a dead time implementing stage for implementing the dead time in accordance with the output of the memory.

2. The apparatus of claim 1, further wherein the processor comprises an arrangement for updating the values stored in the memory at selected times to minimize power loss during dead time.

3. The apparatus of claim 1, wherein the values stored in the memory are stored therein during design of the converter circuit.

4. The apparatus of claim 1, wherein the memory comprises a lookup table.

5. The apparatus of claim 1, wherein the values stored in the memory are stored therein when the converter circuit is first connected to a load and power is applied to the converter circuit, whereby the values are stored in the memory by mapping the values to the circuit parameter over a range of operation of the converter circuit.

6. The apparatus of claim 1, wherein the circuit parameter comprises current through one of the switches, input voltage to the power converter circuit or the temperature of at least one of the switches.

7. The apparatus of claim 6, wherein one of the switches is a synchronous rectifier and the circuit parameter comprises the current through the one switch.

8. The apparatus of claim 7, wherein the monitoring circuit comprises a current sensing circuit for monitoring the current through the one switch.

9. The apparatus of claim 8, wherein the current sensing circuit comprises a sense resistor in series with the switches or a circuit using the average DC voltage across an output inductor of the power converter circuit.

10. The apparatus of claim 8, wherein the current sensing circuit comprises a second switch coupled in parallel to the one switch.

11. The apparatus of claim 1, wherein the monitoring circuit comprises an A/D converter for providing a digital value corresponding to the circuit parameter.

12. The apparatus of claim 11, further wherein the A/D converter provides an output for addressing said memory, whereby said memory produces a value associated with the dead time stored therein corresponding to the circuit parameter.

13. The apparatus of claim 12, further comprising a latch circuit for providing said value from said memory to said dead time implementing stage.

14. The apparatus of claim 13, wherein the latch circuit comprises an up-down counter.

15. The apparatus of claim 14, wherein the processor comprises an arrangement for updating the values stored in the memory at selected times whereby power loss during dead time is minimized, and wherein the counter counts up and down below the value from the memory to determine if a value above or below the value from the memory results in lower power loss.

16. The apparatus of claim 15, further comprising a circuit for providing a value corresponding to power loss for the implemented dead time to the processor.

17. The apparatus of claim 2, wherein the arrangement for updating the values stored in the memory comprises an arrangement for determining the power loss associated with the dead time and minimizing the power loss associated with the dead time.

18. The apparatus of claim 17, wherein the arrangement for determining power loss monitors the duty cycle of a PWM signal supplied to at least one of the two switches.

19. The apparatus of claim 17, wherein the arrangement for determining power loss monitors an error signal output providing a modulation input to a circuit for generating a PWM signal supplied to at least one of the two switches.

20. The apparatus of claim 17, wherein the arrangement updates the values in the memory periodically.

21. The apparatus of claim 20, wherein the dead time implementing stage implements a variable turn-off of a control signal to one of the switches and a variable turn-on of the control signal to said one of the switches.

22. The apparatus of claim 21, wherein the one of the switches performs a synchronous rectification function and the other switch is a control switch.

23. The apparatus of claim 21, wherein the arrangement comprises a module sampling the pulse width modulated signal at selected instants in time corresponding to the first and second dead times; and a processor for controlling timing of the sampling.

24. The apparatus of claim 23, wherein the dead time implementing stage comprises first and second variable delay circuits controlled by the processor.

25. The apparatus of claim 24, wherein the first and second variable delay circuits receive digital inputs from the processor selecting the amount of delay time at turn-on and turn-off of said one of said switches.

26. The apparatus of claim 2, wherein the arrangement changes the dead time by changing a variable turn-on delay and monitors a selected parameter after the change to determine if the power loss is smaller, and if it is smaller, implements the turn-on delay, and if the power loss is not smaller, restores the previous turn-on delay and further wherein the arrangement changes the dead time by changing a variable turn-off delay and monitors the selected parameter after the change to determine if the power loss is smaller, and if it is smaller, implements the turn-off delay, and if the power loss is not smaller, restores the previous turn-off delay.

27. The apparatus of claim 26, wherein the arrangement transmits respective first and second signals to the dead time implementing stage to select a turn-off delay and a turn-on delay of a control signal to one of the switches before the control signal for the control of the other of the switches is turned on and off, respectively.

28. The apparatus of claim 27, further comprising a fixed delay stage for delaying the control signal for the control of the other of the switches.

29. The apparatus of claim 28, wherein the fixed delay stage allows the dead time implementing stage to implement positive and negative amounts of dead time.

30. The apparatus of claim 1, wherein the processor comprises any one of a digital signal processor, microprocessor, microcontroller or logic circuit.

31. The apparatus of claim 1, when the two switches comprise semi-conductor switches.

32. The apparatus of claim 31, where the two switches comprise MOSFETs.

33. A method for setting dead time between ON times of two series connected switches of a power converter circuit connected across a supply potential, the method comprising:
monitoring a power converter circuit parameter and providing an output corresponding to the circuit parameter;
addressing a memory with a signal related to the output and having values stored therein related to the dead times and associated with values of the circuit parameter;
providing an output of the memory associated with the value of the circuit parameter to set the dead time corresponding to the stored value in the memory, and implementing the dead time in accordance with the output of the memory.

34. The method of claim 33, further comprising updating the values stored in the memory at selected times to minimize power loss during dead time.

35. The method of claim 33, further comprising storing the values in the memory during design of the converter circuit.

36. The method of claim 33, further comprising storing the values in a look-up table.

37. The method of claim 33, further comprising storing the values in the memory when the converter circuit is first connected to a load and power is applied to the converter circuit, whereby the values are stored in the memory by mapping the values to the circuit parameter over a range of operation of the converter circuit.

38. The method of claim 33, wherein the circuit parameter comprises current through one of the switches, input voltage to the power converter circuit or the temperature of at least one of the switches.

39. The method of claim 38, wherein one of the switches is a synchronous rectifier and the circuit parameter comprises the current through the one switch.

40. The method of claim 39, wherein the step of monitoring comprises monitoring the current through the one switch.

41. The method of claim 40, wherein the step of monitoring comprises sensing current through a sense resistor in series with the switches or using the average DC voltage across an output inductor of the power converter circuit.

42. The method of claim 33, wherein the step of monitoring comprises providing a digital value corresponding to the circuit parameter.

43. The method of claim 42, further comprising providing the digital value to address said memory, whereby said memory produces a value stored therein associated with the dead time corresponding to the circuit parameter.

44. The method of claim 43, further comprising updating the values stored in the memory at selected times whereby power loss during dead time is minimized, and further comprising counting up and down below the value from the memory to determine if a value above or below the value from the memory results in lower power loss.

45. The method of claim 44, further comprising determining a value corresponding to power loss for the implemented dead time.

46. The method of claim 34, wherein the step of updating the values stored in the memory comprises determining the power loss associated with the dead time and minimizing the power loss associated with the dead time.

47. The method of claim 46, wherein the step of determining power loss comprises monitoring the duty cycle of a PWM signal supplied to at least one of the two switches.

48. The method of claim 46, wherein the step of determining the power loss comprises monitoring an error signal output providing a modulation input to a circuit for generating a PWM signal supplied to at least one of the two switches.

49. The method of claim 46, wherein the step of updating comprises updating values in the memory periodically.

50. The method of claim 49, wherein the step of implementing the dead time comprises implementing a variable turn-off of a control signal to one of the switches and a variable turn-on of the control signal to said one of the switches.

51. The method of claim 50, wherein the one of the switches performs a synchronous rectification function and the other switch is a control switch.

52. The method of claim 34, wherein the step of updating the values stored in memory comprises changing the dead time by changing a variable turn-on delay and monitoring a selected parameter after the change to determine if the power loss is smaller, and if it is smaller, implementing the turn-on delay, and if the power loss is not smaller, restoring the previous turn-on delay and further comprising changing the dead time by changing a variable turn-off delay and monitoring the selected parameter after the change to determine if the power loss is smaller, and if it is smaller, implementing the turn-off delay, and if the power loss is not smaller, restoring the previous turn-off delay.

53. Apparatus for minimizing power losses associated with dead time between ON times of two series connected switches of a power converter connected across a supply potential, the apparatus comprising:
a control arrangement for monitoring a selected parameter associated with power loss during the dead time of the converter;
the control arrangement changing the dead time from a first dead time to a second dead time and comparing power loss associated with the selected parameter for the first and second dead times and determining which of the power losses associated with the two dead times is smaller;
a dead time implementing stage for implementing the two dead times; and
the control arrangement selecting the dead time associated with the smaller power loss and providing a signal to the dead time implementing stage to set the selected dead time, and wherein the selected parameter comprises an error signal output from an error amplifier providing a modulation input to a circuit for generating a PWM signal supplied to at least one of the switches.

* * * * *